United States Patent
Ashe et al.

(10) Patent No.: US 7,736,604 B2
(45) Date of Patent: Jun. 15, 2010

(54) MULTI-PORT FLOW CONTROL VALVES

(75) Inventors: Robert Ashe, Radlett (GB); David Morris, Warrington (GB)

(73) Assignee: Ashe Morris Ltd (GB)

( * ) Notice: Subject to any disclaimer, the term of this patent is extended or adjusted under 35 U.S.C. 154(b) by 972 days.

(21) Appl. No.: 10/488,146

(22) PCT Filed: Aug. 30, 2002

(86) PCT No.: PCT/EP02/09806

§ 371 (c)(1), (2), (4) Date: Aug. 4, 2004

(87) PCT Pub. No.: WO03/018187

PCT Pub. Date: Mar. 6, 2003

(65) Prior Publication Data

US 2005/0002831 A1    Jan. 6, 2005

(30) Foreign Application Priority Data

Aug. 31, 2001   (GB) ................................. 0121071.5

(51) Int. Cl.
*F28D 7/00* (2006.01)
*B01J 19/00* (2006.01)

(52) U.S. Cl. .............. 422/200; 422/106; 422/198; 422/201

(58) Field of Classification Search ......... 422/105–116, 422/198, 200, 201, 284, 285; 208/132, 160, 208/343, 353, 365, 368
See application file for complete search history.

(56) References Cited

U.S. PATENT DOCUMENTS

| | | | | |
|---|---|---|---|---|
| 2,590,436 A | * | 3/1952 | Luten, Jr. ................ | 423/359 |
| 2,596,299 A | * | 5/1952 | Simpson ................. | 422/200 |
| 3,047,274 A | * | 7/1962 | Wilson ................... | 165/281 |
| 3,450,105 A | * | 6/1969 | Osburn ................ | 122/451 R |
| 4,050,506 A | * | 9/1977 | Small ..................... | 165/299 |

(Continued)

FOREIGN PATENT DOCUMENTS

DE          4202959          6/1993

(Continued)

OTHER PUBLICATIONS

International Search Report Application No. PCT/EP02/09806, dated Feb. 12, 2003.

(Continued)

*Primary Examiner*—Walter D Griffin
*Assistant Examiner*—Natasha Young
(74) *Attorney, Agent, or Firm*—Ohlandt, Greeley, Ruggiero & Perle, LLP

(57) ABSTRACT

Multi-port flow control valves are provided wherein the outlet ports may be opened in cascade fashion to allow fluid to flow through the outlet ports into at least two conduits in which the opening of the outlet ports is controlled by a signal indicating the need for fluid in the conduits. The valves are particularly useful for controller the supply of heating/cooling fluid to multiple heating/cooling coils employed to control reactions. In a preferred embodiment the opening of the ports is controlled according to the heat measured in the reaction.

8 Claims, 10 Drawing Sheets

U.S. PATENT DOCUMENTS

| | | | | |
|---|---|---|---|---|
| 4,132,530 | A | * | 1/1979 | Schwimmer ................ 585/263 |
| 4,165,035 | A | * | 8/1979 | Maltby ........................ 236/86 |
| 4,491,924 | A | * | 1/1985 | Agarwal ..................... 700/266 |
| 4,571,325 | A | * | 2/1986 | Nikolov et al. .............. 422/191 |
| 4,721,575 | A | * | 1/1988 | Binning et al. .............. 210/761 |
| 5,287,915 | A | * | 2/1994 | Liu et al. ..................... 165/84 |
| 5,664,426 | A | * | 9/1997 | Lu ................................. 62/93 |
| 5,762,879 | A | * | 6/1998 | Nomura et al. ............. 422/109 |
| 5,802,870 | A | * | 9/1998 | Arnold et al. ................ 62/480 |
| 2003/0133858 | A1 | * | 7/2003 | Le .............................. 422/201 |

FOREIGN PATENT DOCUMENTS

JP      2000130613 A   *   5/2000

OTHER PUBLICATIONS

Mike Spear; "Constant Flux Reactor"; Process Engineering; Feb. 1, 2004; pp. 17-18.

Deborah Hairston; "Tweaking Chemical Reactors"; Chemical Engineering; Nov. 1, 2003; p. 25.

* cited by examiner

MULTI-PORT FLOW CONTROL VALVES

1. FIELD OF INVENTION

The present invention relates to valves and in particular to valves which may be used to control the delivery of fluids, gases and/or liquids in a cascade fashion to two or more conduits. The invention is particularly useful in the delivery of temperature control fluids especially to chemical reactors which employ multiple cooling elements to provide a variable area heat transfer control system.

2. DISCUSSION OF THE BACKGROUND ART

PCT Patent applications PCT/EP02/04651, PCT/EP02/04646, PCT/EP02/04650 and PCT/EP02/04648 describe a system for measuring heat liberated or absorbed by a chemical or physical reaction. This information can be used for measuring and controlling reaction efficiency in steady state processes and reaction progress in unsteady state processes. The control is affected by measuring the temperature change in the heat transfer fluid to determine the quantity of heat liberated or absorbed by the reaction and adjusting the area of temperature control surface available to the reaction accordingly.

The earlier patent applications describe a system containing a series of heat transfer coils where individual heat transfer coils are designed such that the heat transfer area of the heat transfer pipe is matched (approximately given that U varies with flow, temperature and liquid properties and it varies with application) with the flow carrying capacity of the liquid such that:

$$U.A.LMTD = m.Cp.(t_{si}-t_{so})(kW)$$

where U=overall heat transfer coefficient $(kW.m^{-2}.K^{-1})$
A=heat transfer area $(m^2)$
m=mass flow rate of heat transfer fluid (kg/s)
LMTD=log mean thermal difference between service and process fluids (° C.)
Cp=specific heat of heat transfer fluid $(kJ.kg^{-1}K.^{-1})$
$(t_{si}-t_{so})$=temperature (° C.) change in the heat transfer fluid between inlet and outlet The system described in PCT Patent applications PCT/EP02/04651, PCT/EP02/04646, PCT/EP02/04650 and PCT/EP02/04648 is a variable area heat transfer system. Multiple coils are used in combination to match the desired operating conditions. The ability to transition between these coils in a smooth, bounce-less manner is of great importance to the stability of the system. Poor accuracy of the heat measurements can result from a crudely implemented system. The system described in the PCT Patent applications PCT/EP02/04651, PCT/EP02/04646, PCT/EP02/04650 and PCT/EP02/04648 utilizes multiple control and switching valves to bring individual coils into or out of operation. This is however a complicated system which can involve jumps in the system as one switches a new coil into action or as one switches a coil out of action. The use of a multi-port flow control valve, which whilst achieving a high degree of control also offers the additional benefits of a compact design, reduces the amount of control signals required and enables smoother transitions.

SUMMARY OF THE INVENTION

The present invention therefore provides a valve for the control of the delivery of fluids to two or more conduits in a cascade fashion wherein the valve has multiple outlet ports operating in a cascade wherein the outlet ports are opened and/or closed according to a signal expressing the requirement for fluid in the conduits.

The multi-port flow control valve of the present invention is unlike conventional control valves in that whereas most conventional control valves will have a single inlet and a single outlet port, this valve will preferably have a single inlet, and multiple outlet ports operating in a cascade fashion as the valve is modulated. Some control valves, such as the Baumann model 2400 Little Scotty 3-way control valve (as described in U.S. Pat. No. 4,434,965) do have more than one inlet or outlet port. The Little Scotty is however designed for use as a diverting or mixing valve; as such several valves arranged in a cascade would be needed to provide heat transfer fluid for the control of a variable area reactor, but the use of multiple valves is of no benefit when compared to a system based on conventional control valves.

DETAILED DESCRIPTION OF THE PREFERRED EMBODIMENT

Figure 1:
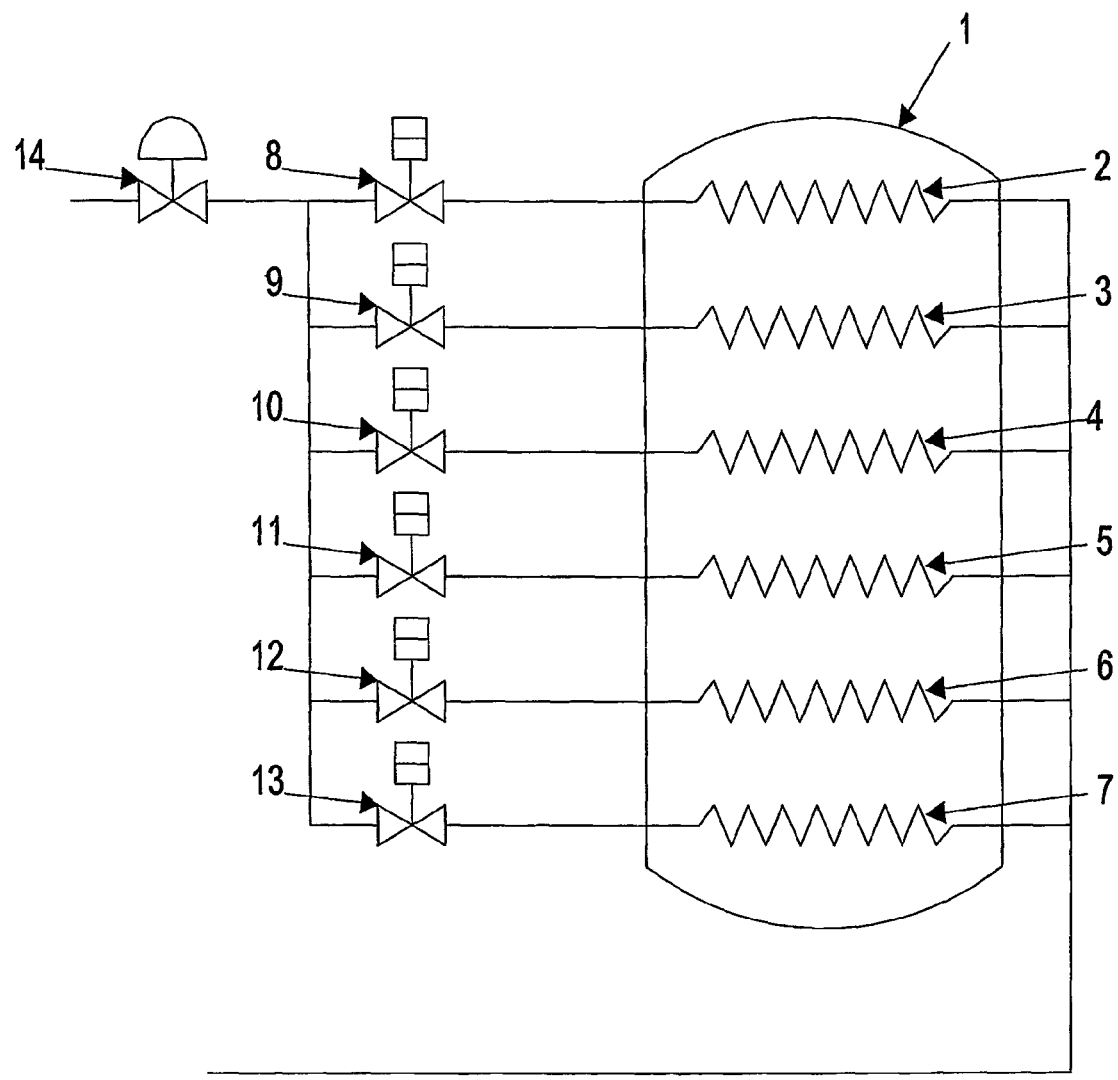
FIG. 1 is a schematic illustration of a multi-valve control system.

The valves of the present invention and their use for the control of the flow of heat transfer fluids for temperature control in a reactor is illustrated in the accompanying drawings in which:

FIG. 1 is a schematic illustration of a multi-valve control system as employed in PCT Patent Applications PCT/EP02/04651, PCT/EP02/04646, PCT/EP02/04650 and PCT/EP02/04648.

Figure 2:
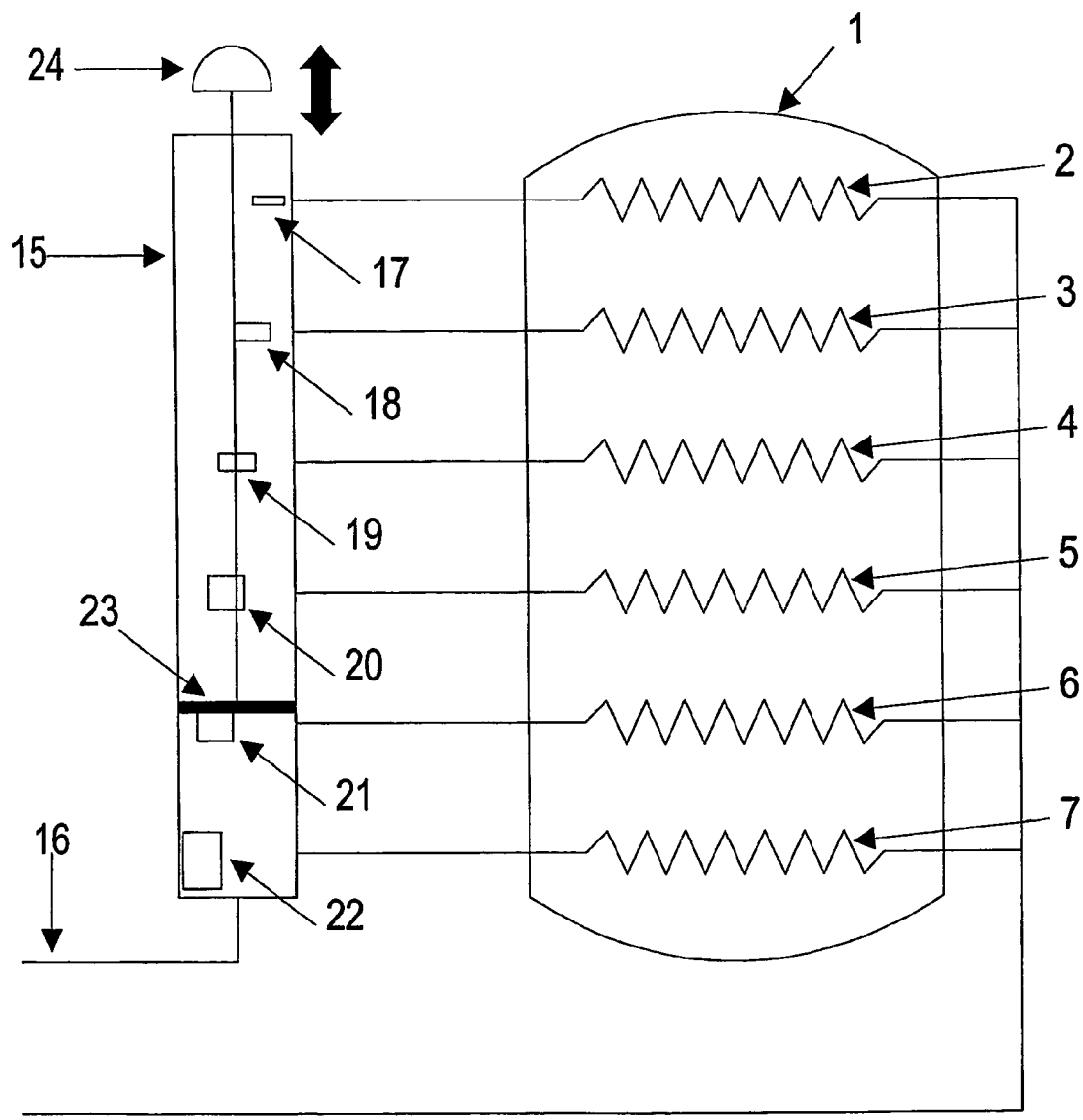
FIG. 2 is a schematic illustration of a the system of FIG. 1 in which the multi-valve system has been replaced by a multi-port control valve of the present invention.

FIG. 2 is a schematic illustration of the system of FIG. 1 in which the multi-valve system has been replaced by a multi-port control valve according to the present invention.

Figure 3:
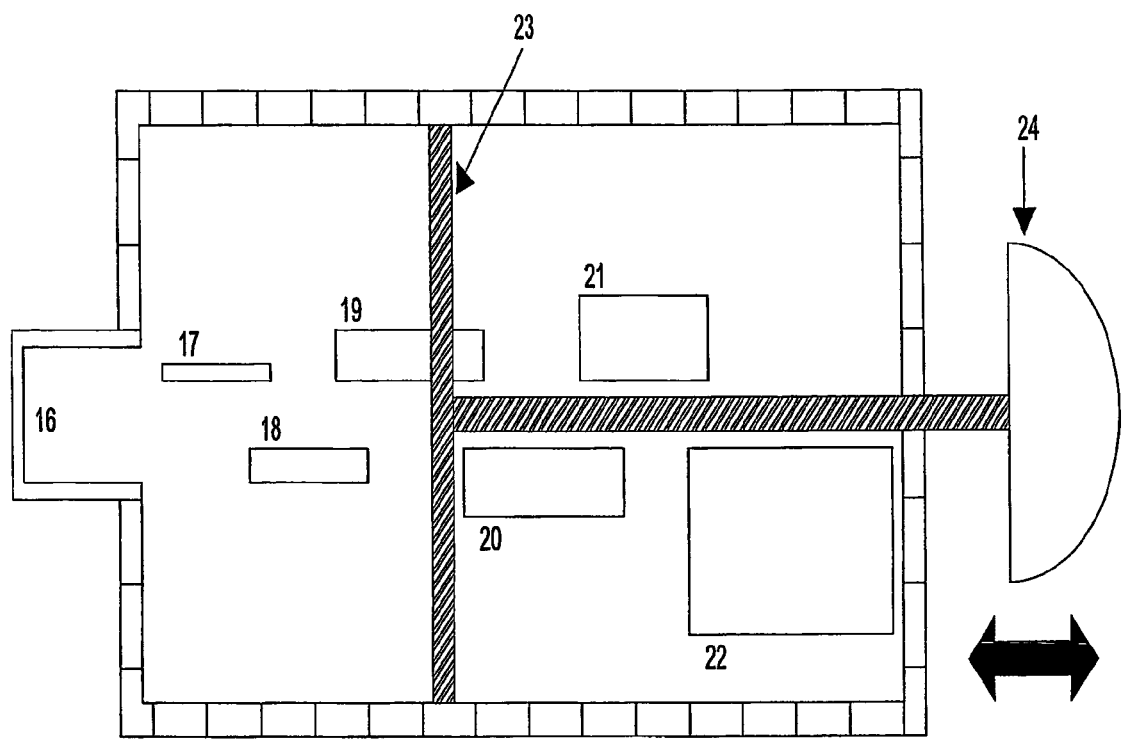
FIGS. 3 and 4 illustrate alternative configurations for the outlet ports and show how the outlet ports may be progressively opened and closed to the fluid supplied through the inlet port by the movement of the plunger.
Figure 4:
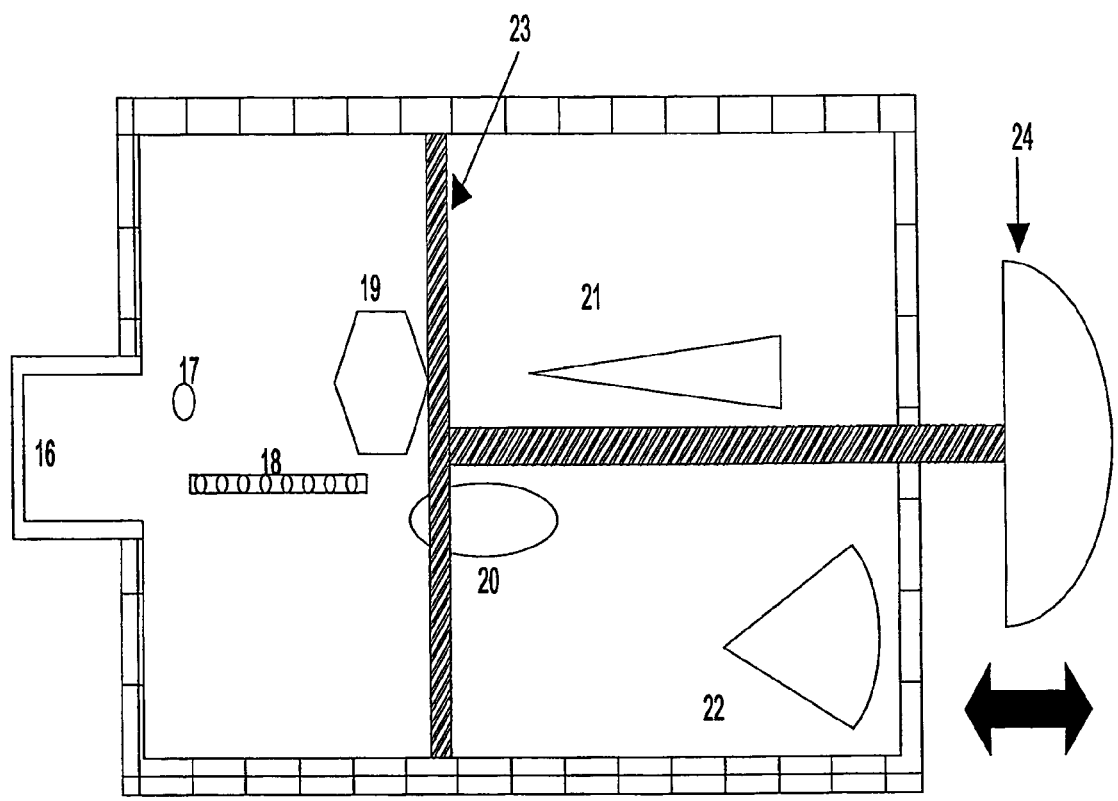

FIGS. 3 and 4 illustrate a valve operated in a linear fashion and shows how the outlet ports may be shaped and configured according to the needs of the system.

Figure 5:
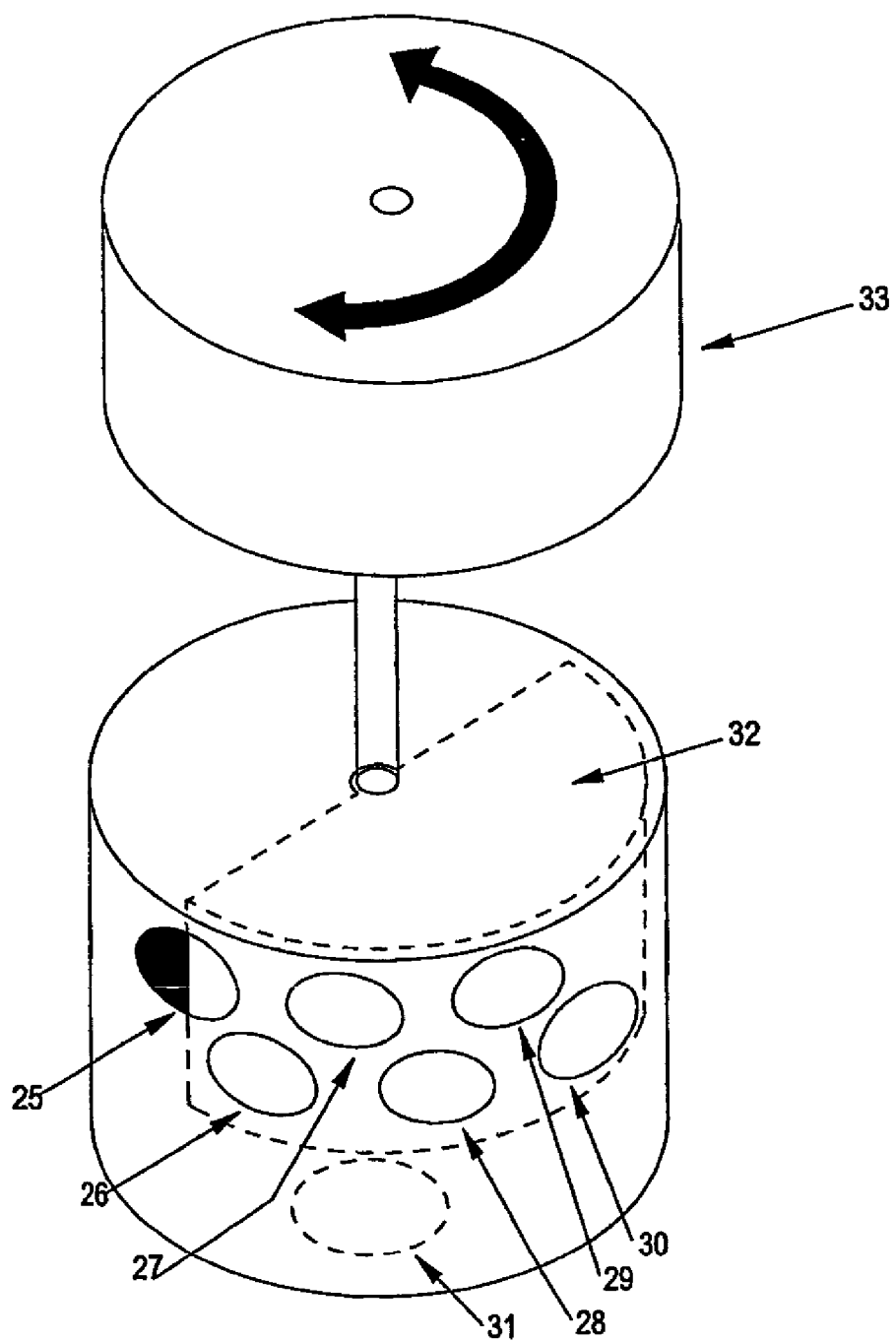
FIG. 5 show an alternate form of a valve according to the present invention.

FIG. 5 shows a multi-port control valve operated in a rotary fashion.

FIG. 1 shows a chemical reactor (1) provided with a series of heating/cooling coils (2 to 7). The flow of heat transfer fluid to each coil is selected by separate valves (8 to 13). The flow rate to the selected coils is controlled by valve (14). This system is as illustrated in and operates in the manner described in PCT Patent Applications PCT/EP02/04651, PCT/EP02/04646, PCT/EP02/04650 and PCT/EP02/04648.

FIG. 2 shows the same reactor (1) with the same heat transfer coils (2 to 7) but the valve system (8 to 13) and control valve (14) has been replaced by a single control valve (15) which has a single inlet line (16) and multiple outlet ports (17 to 22). In operation the outlet ports may be opened or closed in a cascade fashion to enable fluid to flow into selected cooling coils or to cut off the flow of fluid into selected coils. The position of the plunger (23) is determined by the actuator (24) in response to a signal supplied by the control system. Indeed the plunger may be positioned to partially block an outlet port if full flow is not required to that particular coil.

FIGS. 3 and 4 illustrate alternate configurations for the outlet ports and show how the outlet ports may be progressively opened and closed to the fluid supplied through the inlet port by the movement of the plunger (23). It can be seen from FIGS. 3 and 4 that the relative positioning and shape of the outlet ports can be designed to enable a smooth control of the flow of heat transfer fluid to the coils. The $C_v$ of each individual orifice can be characterised to match each particular coils flow requirements in a similar way to that of a conventional control valve.

FIG. 5 shows an alternate form of a valve according to the present invention in which the outlet ports (25 to 30) may be opened and closed to the fluid supplied through inlet port (31) by rotation of a cam (32) by the actuator (33). The relative positioning and shape of the outlet ports can again be designed to enable smooth control of flow of heat transfer fluid to the coils. The sizes and shapes of the outlet ports will again be similar to those used for the linear version illustrated in FIGS. 3 and 4.

The valves of the present invention therefore can be designed to provide the same control characteristics as a conventional control valve for each of its multiple outlet ports and as such can be used to replace multiple conventional valves with a single multi-port flow valve having a single means of activation requiring at least one control signal only as opposed to multiple valves and actuators and one control signal per control valve.

A multi-port flow control valve of the present invention can therefore be constructed to operate either with a linear or rotary action. The number of outlet ports will depend on the number of individual flows, which need to be independently controlled. In the example illustrated in FIG. 2, 6-heat transfer coils are used, but the valve of the present invention can be designed for use with any number. By modulating the multi-port flow control valve the effective heat transfer area in the reactor can be varied. The maximum number of outlet ports on this type of valve is limited only by the physical constraints of the construction. Similarly the use of a multi-port flow control valve is not limited to variable area reactors and could equally be used for other similar applications.

When used with a variable area reactor improved control of the flow to each coil can be achieved by characterising the individual outlet ports. This is achieved by designing each outlet port to a specific size and profile. Any combination of port sizes and profiles can be used, dependent on the specific $C_v$ and flow characteristics required. By overlapping the outlet port profiles, smooth and bump-less transitions can be made between each variation in heat transfer area. A similar valve, which does not have overlapping outlet port profiles, can be used and may still provide acceptable results in certain circumstances. FIG. 3 illustrates a typical overlapping port arrangement of a 6-port linear valve. In this example different width slots have been used to extend the range and turn down of the valve. FIG. 4 shows a second typical arrangement, but in this instance different port profiles provide a different overall characteristic. By varying the number of ports and port profiles, the only restrictions to the infinite number of characteristics achievable are the physical size restrictions of the hardware.

Any material may be used to construct a multi-port flow control valve, providing that it is resistant to corrosion and wear from the liquid or gas it controls.

In its linear form the multi-port flow control valve has an internal plunger, which regulates the flow according to a control signal given to a linear actuator by the control system. In the case of a rotary valve, an internal cam is used to block off the unused ports in a cascade fashion (a ball, plug, disc, globe etc. can be used in place of the cam). The cam or piston can be positioned (in response from a signal to the control system) to partially block off any one or of the outlet ports. Thus a fine level of smooth bounce-less control can be achieved with either the linear or rotary valve.

Actuation of either variant (linear or rotary) of the multi-port flow control valve can be achieved with any of the established valve actuator techniques. This includes, but is not limited to: pneumatic, hydraulic, electric, linear transformer etc.

Whilst the valves of the present invention may be used in any system which involves delivery of fluids to two or more conduits it is particularly useful in the supply of heat transfer fluids to the variable area heat transfer systems in reactors described in PCT Patent Applications PCT/EP02/04651, PCT/EP02/04646, PCT/EP02/04650 and PCT/EP02/04648. These reactors may be used in any processes involving physical or chemical change in which heat is released or absorbed. Its use will therefore be illustrated in relation to such a system.

In its preferred application the invention is used in connection with variable area heat transfer systems used to improve the ability to monitor the progress of physical and/or chemical reactions, it is also used in connection with improving the control of reaction systems through the improved monitoring. The improved control of the flow of heat transfer fluid that is provided by the present invention enables the production of materials of higher quality and purity, it enables more efficient use of reaction equipment and can further improve the efficiency of the equipment so that shorter reaction times are needed to obtain a given amount of material from a given amount of starting materials. Another advantage is that smaller reactors may be used to produce a given volume of material.

Many reactions are hazardous and care needs to be taken to ensure no accidents. The more accurate and more timely control of the reaction provided by this invention enables reactions to be performed within stricter limits. This enhances safety and can reduce the reaction inefficiencies that, hitherto, were an inherent shortcoming of the manufacturing process.

Reactions whether they be physical, chemical or both generate or absorb heat and there is therefore a heat change across the reaction. The theoretical heat generated or absorbed in a particular reaction is known from established information. The actual heat generated or absorbed during the course of a reaction could therefore, in theory, be a useful measure to determine reaction efficiency in the case of steady state reactions and reaction progress in the case of batch reactions.

By way of an illustration of the theory, a typical chemical synthesis step will be considered. Two reagents (A and B) react together to form a new compound (C) as follows:

$$A + B \rightarrow C$$

where A=kmol of A
B=kmol of B
C=kmol of C

The heat generated by this reaction is established according to the formula:

$$Q = \Delta Hr.C \text{ (kJ)}.$$

where $\Delta Hr$ = heat of reaction per kmol of C produced (kJ/mol)
C = kmol of component C produced (kmol)

The value of $\Delta Hr$ may be determined from theoretical data or laboratory calorimeters.

Currently the heat data described may be used in a variety of ways.

For any reaction, the maximum theoretical heat liberation can be calculated as follows:

$$Q' = \Delta Hr.C' \text{ (kJ)}$$

where Q' = maximum theoretical heat generated (kJ)
$\Delta Hr$ = heat of reaction per kmol of C produced (kJ/kmol)
C' = maximum theoretical yield of component C (kmol)

The maximum theoretical yield C' is based on the assumption that one or both of the feed components (A and B) are completely consumed.

If the heat of reaction is measured during a process, the quantity of component C synthesised at any time is as follows:

$$C = Q/\Delta Hr \text{ (kmol)}$$

where C = quantity of C produced (kmol)
Q = heat measured during the reaction (kJ)
$\Delta Hr$ = heat of reaction per kmol of C produced (kJ/kmol)

Thus the total mass of C can be calculated by knowing the total heat absorbed or liberated and the heat of reaction (or crystallisation etc).

The expected theoretical yield of C is known from the quantity of reactants present and the stoichiometry of the process. Thus from the information above, the percentage conversion can be determined from the equation below.

$$\eta = C/C' \times 100$$

where $\eta$ = percent conversion
C = quantity of C produced (kmol)
C' = maximum theoretical yield of component C (kmol)

In batch reactions, percent conversion ($\eta$) provides an effective means of identifying reaction end point. This can be used to reduce manufacturing time and improve plant utilisation.

In continuous (plug) flow reactors, reaction efficiency ($\eta$) provides a parameter for controlling feed rate to the reactor and controlling process conditions. In this way it is possible to run conventional batch processes in small-scale plug flow reactors. This benefits all aspects of the manufacturing process including lower capital cost for equipment, increased plant versatility, improved product yield, safer process conditions (through smaller inventories), greater product throughput and reduced product development time.

The ability to monitor reaction progress has an additional safety benefit for both small and large reactors. A system with online calorimetric data can instantly identify when unreacted compound is accumulating in the reactor. This reduces the risk of runaways due to accumulation of unreacted chemicals.

The design of reactors in common industrial use is however inherently unsuitable for measuring calorimetric data and thus the techniques described remain theoretical.

Chemical reactors in common use in, for example, the pharmaceutical and fine chemical industries fall into four main categories. Standard batch reactors in which reagents are mixed in a stirred vessel in which heat is added or removed by means of heat transfer fluid recirculating though an external jacket. These are the most commonly used reactors for small-scale organic and inorganic synthesis reactions. Batch reactors with internal coils, which are a variation on the standard batch reactor and have additional heat transfer surfaces within the body of the liquid. These reactors are used for general-purpose batch reactions where higher heat loads are encountered. Loop reactors in which reactants are pumped through an external heat exchanger and returned to the vessel. These are commonly used for gas/liquid reactions in which case the liquid is returned to the reactor via a spray nozzle to create a high gas/liquid interfacial area. Continuous reactors in which reactants are pumped through a heat exchanger under steady state conditions. These are generally used for larger scale manufacturing processes with long product runs.

The heat transfer characteristics of the four types of reactors described above have three common features:

i. The heat transfer fluid is circulated through the heat exchangers at high velocity to maintain favourable heat transfer coefficients. In the case of jacketed reactors, this is achieved by injecting the heat transfer fluid into the jacket at high velocities using nozzles or diverting flow around the jacket with baffles. In some instances, coils for the flow of heat transfer fluid are welded to the outside wall of the reactor vessel.

ii. High mass flow rates of heat transfer fluid are employed to maintain a good average temperature difference between the heat transfer fluid and the process fluid.

iii. The heat transfer area is fixed and temperature control of the process fluid is achieved by varying the temperature of the heat transfer fluid. In some cases limited scope exists for increasing or decreasing the heat transfer area.

The features described above represent good design practice for achieving a flexible and optimised heat transfer capability within the reactor. However, these features do not lend themselves to measuring the quantity of heat generated or liberated or to the use of the measurement of the heat generated or liberated to control the flow of heating/cooling fluid to provide improved control of the reaction. This deficiency is illustrated by reference to the chemical reaction between reagents A and B as discussed above. (It should be noted that the Example is not limited to chemical reactions and is equally applicable to other chemical and physical processes).

When the two reagents (A and B) react together to form C, heat is liberated. The heat liberated per second can be expressed as follows:

$$q = \Delta Hr.c \text{ (kW)}$$

where q = heat liberated per second (kW)
$\Delta Hr$ = heat of reaction per kmol of C produced (kJ/kmol)
c = kmols of component C produced per sec (kmol/s)

If the process temperature remains constant the heat liberated (q) will be observed as a temperature rise in the heat transfer fluid according to the formula.

$$q = m.Cp(t_{si} - t_{so}) \text{ (kW)}$$

where q = heat liberated by the reaction (kW)
m = mass flow rate of the heat transfer fluid (kg/s)
Cp = specific heat of heat transfer fluid (kJ.kg$^{-1}$K$^{-1}$)
$t_{si}$ = temperature of heat transfer fluid in (° C.)
$t_{so}$ = temperature of heat transfer fluid out (° C.)

However, in order to determine q, the flow rate and temperature change of the heat transfer fluid ($t_{si}$-$t_{so}$) must be measured accurately. In the reactor examples described above, effective design favours high flow rates of heat transfer fluid. Often this leads to a temperature change of the heat transfer fluid ($t_{si}$-$t_{so}$) of less than 1° C. An IEC Class A RTD is one of the more accurate temperature measurement devices available. These devices have a tolerance of ±0.25° C. (the error on the installed device may be higher). Thus for a temperature change of 1° C., the accuracy of heat measurement can be expected to be ±25% or worse. This would rise to 250% where the heat transfer fluid temperature changed by 0.1° C. This factor alone makes it virtually impossible to measure the heat of reaction in conventional reactors which, in turn, makes it difficult to accurately control the flow of heating/cooling fluid. Furthermore, on a conventional reactor, heat leaking out of the system via the non-process side of the jacket can create serious error.

Furthermore, conventional chemical reactors often have sluggish control systems which permit temperatures of the bulk material to cycle by a few degrees. In energy terms a few degrees change in temperature can represent a significant proportion of the overall energy release.

Conventional reactors offer acceptable heat transfer characteristics when the flow of heat transfer fluid is held at a good velocity. Since the heat transfer surface is limited to 1 or 2 discrete elements, the range (of energy liberated or absorbed) over which a useful service temperature rise ($t_{si}$-$t_{so}$) can be achieved is very limited. In a case where the energy release from the process is small, the temperature rise in the heat transfer fluid may be a fraction of a degree. In addition to this, the shaft energy of the heat transfer pump could be a high proportion of the total.

The limitations described above are common to all reactors (and evaporators, batch stills etc) used in the pharmaceutical, chemical and allied industries. Accordingly, when employing these reactors the heat generated or consumed by the reaction cannot be used to monitor and control the progress of a reaction within any degree of accuracy.

PCT Patent applications PCT/EP02/04651, PCT/EP02/04646, PCT/EP02/04650 and PCT/EP02/04648 provide various aspects of reaction systems comprising a reactor containing a reaction process medium and a heat exchanger comprising at least two conduits through which flows a heat transfer fluid. In the processes of these patent applications, measurement of the flow rate and temperature change of the heat transfer fluid across the reaction is used to determine the heat generated or absorbed by the reaction system and that determination is used to monitor and control the reaction by varying the area of the heat exchanger available to the reaction process medium. As stated in these applications, this can be effective providing i. the average temperature difference between the heat transfer fluid and the processes fluid is from 1 to 100° C.
ii. the temperature differential ($t_{si}$-$t_{so}$) of the heat transfer fluid across the reaction system is at least 1° C.
iii. the linear velocity of the heat transfer fluid is at least 0.1 meters/second.

Providing these criteria are satisfied measurement of the flow rate and temperature change of the heat transfer fluid across the reaction enables the heat generated or absorbed by the reaction system to be determined with a high degree of accuracy over a wide range of operating conditions. The determination may then be used to monitor the reaction with a high degree of accuracy. The valve system of the present invention may then be operated according to this determination to enable the ports which provide fluid to the coils to be opened and closed in a smooth cascade fashion.

Whilst any form of conduit may be used for the heat exchanger, pipes or coils are preferred.

PCT Kingdom Patent applications PCT/EP02/04651, PCT/EP02/04646, PCT/EP02/04650 and PCT/EP02/04648 in order for effective operation of these monitor and control systems the reaction system should preferably have the following characteristics:

a. The heat exchanger should have sufficient surface area to ensure that a measurable temperature difference ($t_{si}$-$t_{so}$) is observed in the heat transfer fluid as it passes across the reactor. For the purposes of accuracy, a temperature difference of more than 1° C. (more preferably more than 10° C.) is desirable.
b. A high temperature difference is preferably maintained between the process fluid and the inlet heat transfer fluid ($t_{si}$) to ensure that an accurately measurable service fluid temperature change ($t_{si}$-$t_{so}$) can be achieved and smaller heat transfer areas are required.
c. As far as possible, heat must only be transferred to or from the process fluid and not be transferred to other equipment or the environment
d. The heat transfer fluid must always flow at a reasonable velocity. The velocity will vary with coil size and conditions but it is preferred that it is greater than 0.1 m/s more preferably greater than 1 m/s. Lower velocities will give slower temperature control response. Low velocities also give a higher ratio of thermal capacity (of the heat transfer fluid) to heat release rate. This will compound errors in the values of measured heats.
e. When used for batch processes or multi-purpose duties, the heat transfer equipment should be capable of stable operation over a wide range of energy release/absorption rates. The range will vary according to the nature of the reaction. In the case of batch reactions a very wide operating range will be required.

To satisfy condition c above, the heat exchanger is preferably immersed in the process fluid and should be fully insulated at all points other than where fully immersed in the process fluid. This ensures that all the heat gained or lost by the heat transfer fluid is transferred directly from and to the process fluid. This condition is most easily achieved by designing the heat exchanger as a coil or coils fully immersed in the process fluid.

It is further preferred that an optimal relationship between heat transfer surface area to heat transfer fluid flow capacity is provided. Such conditions exist when the heat transfer fluid (traveling at the desired linear velocity) provides an easily measured temperature change (such as 10° C.) without incurring excessive pressure drop. It should be noted that the optimum heat transfer conditions vary according to the properties of the process fluids and heat transfer fluids respectively. The valve system of the present invention enables the smooth introduction and removal of coils thus providing a smooth control of the available heat transfer surface area.

In order to satisfy these criteria, the heat exchanger for the reactor is preferably a heat transfer coil, which preferably passes through the reaction fluid. The design of the coil is important to achieving the object of the invention and must be such that the heat transfer area matches the heat carrying capacity under specified conditions.

The valves of the present invention may be used in systems in which the heat transfer fluid is straight through or recycled.

In the preferred reactors with which the present invention is used the heat transfer area of a coil may be related to the flow carrying capacity of the liquid by using the formula $$U.A.LMTD = m.Cp.(t_{si}\text{-}t_{so})(kW)$$

where U=overall heat transfer coefficient ($kW.m^{-2}.K^{-1}$)

A=heat transfer area ($m^2$)
m=mass flow rate of heat transfer fluid (kg/s)
LMTD=log mean thermal difference between service and process fluids (° C.)
Cp=specific heat of heat transfer fluid ($kJ.kg^{-1}K^{-1}$)
($t_{si}$-$t_{so}$)=temperature (° C.) change in the heat transfer fluid between inlet and outlet This information may then be used to determine the optimum diameter to length relationship of an individual coil whereby high turbulence is achieved without incurring excessive pressure drop of heat transfer fluid through the heat exchanger (as shown by a high Reynolds number). In the preferred system the following criteria apply:

a. The temperature difference between the inlet heat transfer fluid and the process fluid should be large enough (e.g. 5-100° C.) to ensure that the heat transfer fluid undergoes a measurable temperature change (>1° C. or preferably greater than 10° C.) in its passage through the coil. The temperature change must not however be so high or low as to cause freezing, waxing out, boiling or burning of the process fluid.

b. The heat transfer area must be large enough to ensure that the heat transfer fluid undergoes a measurable temperature change (>1° C. or preferably greater than 10° C.) through the process fluid. Smaller temperature changes limit heat transfer capacity and accuracy. Higher temperature changes are desirable providing they do not cause freezing, waxing out, boiling or burning of the process fluid.

c. The linear velocity of heat transfer fluid must be reasonably high (preferably >0.1 $m.s^{-1}$) in order to maintain satisfactory control response and a good overall heat transfer coefficient.

d. The pressure drop of heat transfer fluid flowing through the coil is from 0.1 to 20 bar.

In practice, optimum coil lengths will vary according to the temperature differences employed and the thermodynamic and physical characteristics of the system. Calculating optimal coil length is an iterative process. A general-purpose device will be sized using conservative data based on fluids with low thermal conductivity and a low temperature difference between the reaction fluid and the heat transfer fluid. Each coil will have a limited operating range.

In a preferred system in which the heat transfer equipment is capable of stable operation over a wide range of energy releases, the system is such that the area of heat transfer may be varied according to the needs of the particular reaction (or stage of reaction). This may be conveniently accomplished by providing multiple heat transfer pipes each of which has a diameter and length relationship designed to provide a certain degree of heat transfer. The valve system of the present invention enable the pipes to be brought into and out of operation in a smooth cascade fashion as the needs of the reaction system dictates.

As the load increases the flow of heat transfer fluid to a coil (or set of coils) can be increased using a flow control valve of the present invention. In this way when the heat generation measurement indicates that an additional coil is required to accommodate a rising load, the control valve will be activated to ensure smooth transition to the higher flow. Use of a valve of the present invention will ensure a rapid and smooth flow control response to the step change in the system pressure drop. The use of the valve will provide a smooth transition between operating conditions and enable a wide operating range employing a large number of coils.

Fast and accurate temperature measurements is important. To achieve this, the temperature element is conveniently mounted in fast flowing heat transfer fluid. A minimum hold up volume (of service liquid) should exist between the temperature elements and the heat transfer surface. This may be achieved by using sub manifolds on the discharge pipes as shown in FIG. 6.

Figure 6:
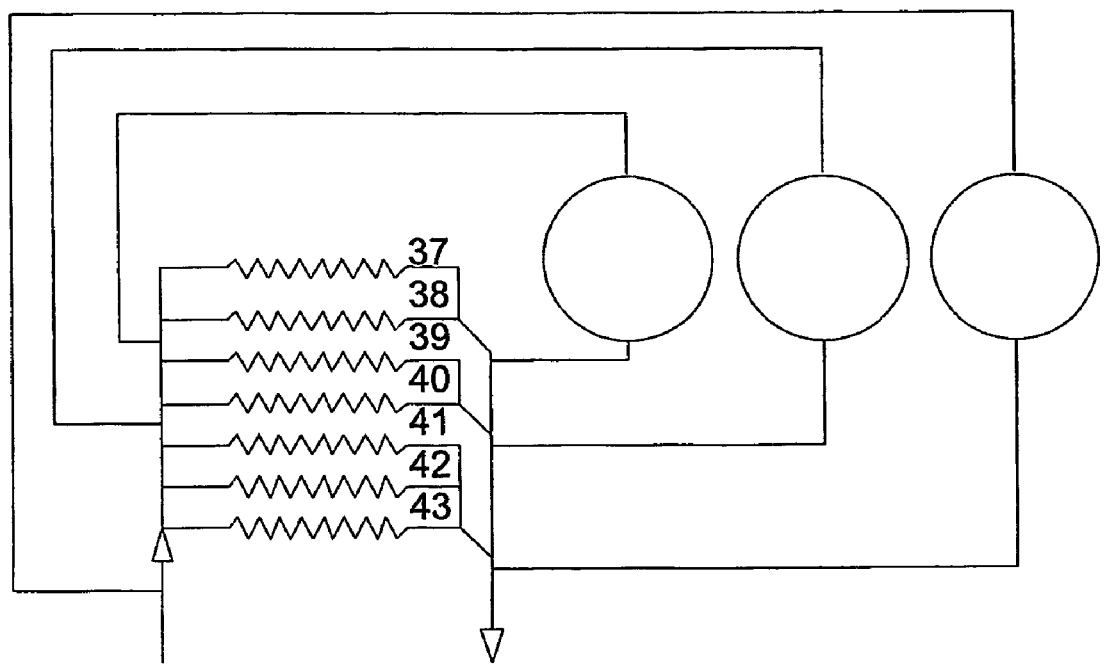
FIG. 6 is a schematic illustration showing three differential temperature measuring devices on a seven-coil system.

FIG. 6 is a schematic illustration showing three differential temperature measuring devices (34), (35) and (36) on a seven-coil system based on coils (37) to (43). These devices measure temperature change of heat transfer fluid flowing across the coils. The temperature devices work in a cascade fashion. At low flow (coil 37 or coils 37 and 38 operating) measuring device (34) is used for measuring discharge temperature. When three or more coils are operating, measuring device (34) switches to idle and measuring device (35) takes over. When five or more coils are operating, both (34) and (35) switch to idle and measuring device (36) takes over. This concept is applied irrespective of the number of coils and temperature devices used. It is preferred that the linear velocity of the heat transfer fluid as it passes the temperature element is one meter per second or greater (although slower velocities can be tolerated). The temperature devices must be highly accurate and sensitive. It should be noted that separate inlet and outlet temperature devices could be used as an alternative to the differential devices.

In a preferred process, in addition to the normal process temperature transmitters, which constantly measure the process across its entire range and provide the necessary safety interlocks, a second pair of temperature elements can be provided to monitor the specific process set point. The arrangement uses two different types of measuring elements. The main device is preferably an RTD, a 4 wire Pt100 RTD to $\frac{1}{10}^{th}$ DIN standard being especially suitable. The transmitter used to provide the 4-20 mA output signal is spanned to the minimum allowable for the transmitter (similarly any output signal type or temperature span could be used). The temperature transmitter will be calibrated specifically at the process set point. Larger ranges will still give acceptable results, but reducing the span to the minimum possible offers improved accuracy and resolution. Thus this arrangement will provide an extremely accurate means of process temperature measurement.

The element of the temperature measurement system is the part of the device which is in contact with the liquid. In the case of an RTD, its resistance will change in response to changing temperature. The response of an RTD is not linear. The transmitter is the calibrated part of a measuring device and is used to linearise the output to the control system and convert the signal to an industry standard, usually 4-20 mA, but it could also be 1-5 V or 0-10V. A thermocouple's response to a change in temperature is a varying voltage. Usually milli volts per ° C. A thermocouple transmitter will again convert this signal to an industry standard, again more often than not, 4-20 mA. Accordingly the term 'element' when describing a physical mechanical presence in the process, e.g., a temperature element is located in the reactor and measures the temperature of the reactor contents. And the term 'transmitter' when describing aspects of temperature measurement relating to the control system, e.g., a temperature transmitter is calibrated 0-100° C. and displays the contents temperature of the reactor. It is the signal from the transmitter which is used to operate the valve of the present invention when used in this type of reactor system.

The limitation of any RTD is its speed of response to a step change in temperature. Typically it can take up to four or five seconds for an RTD to measure a change in temperature. Thermocouples, on the other hand, can respond much more rapidly to temperature fluctuations. For this reason a thermocouple is also used to monitor the process set point, a T type thermocouple being especially suited. Its transmitter will be similarly ranged to the RTD. However, as a T type thermocouple has an accuracy of only + or −1° C., it will not be used to monitor the process temperature. Its function is to monitor the rate of change of the process temperature.

The combined use of these two different types of sensing elements provides a temperature sensing system, which is extremely accurate; this information may then be relayed to operate the valve of the present invention in response to the heat generated to provide a highly responsive reactor control system. It should be noted that not all process operations require this level of temperature measurement accuracy and control. In such cases, more basic temperature control and measurement systems will prove tolerable.

In order to fully utilize this two-element approach, custom software is used to determine which process variable (temperature, or rate of change of temperature) is the most significant at any one instance in time.

Figure 7:
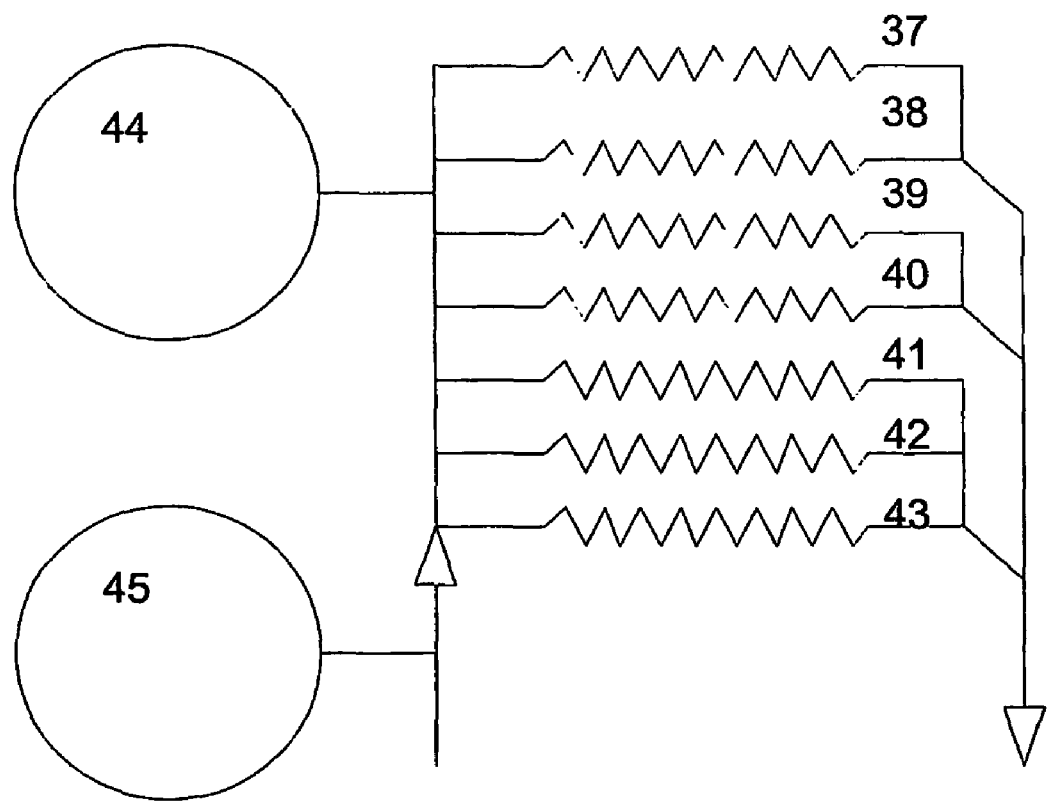
FIG. 7 shows a flow measurement system for the reactor shown in FIG. 6 employing multiple flow devices.

Accurate measurement of the flow of the heating/cooling fluid is also important for effective operation of the type of reactor system described in PCT Patent applications PCT/EP02/04651, PCT/EP02/04646, PCT/EP02/04650 and PCT/EP02/04648. FIG. 7 shows a flow measurement system for the reactor shown in FIG. 6 employing multiple flow devices. Flow device (44) is a low range device for measuring flow when coils (37) or coils (37) and (38) are in operation. When three or more coils are in operation, flow device (45) takes over and (44) switches to idle. Any number of flow transmitters can be used to achieve satisfactory accuracy. As a general rule, the number of flow devices to be used should be calculated as follows Number of flow devices=$(F_{max}-F_{min})/(R.F_{min})$ where $F_{max}$=maximum flow (kg.s$^{-1}$)
$F_{min}$=minimum flow (kg.s$^{-1}$)
R=turn down ratio of the flow instrument The above equation makes reference to mass flow. The equipment can use a volume flow device however provided the system converts volume flow data into mass flow data. This can be done automatically by the control software (mass flow=volume flow×liquid density). For sensitive systems (or those with a wide temperature range) compensation should be made for changes in liquid density. Information on liquid density can be input manually into the control system. Alternatively, the control software can calculate the density based on temperature using established mathematical relationships.

The system works most effectively under isothermal conditions. It can however be used for reactions where the process temperature changes. In this case it is necessary to measure the heat capacity of the system as follows:

$\Sigma M.Cp=(M_p.Cp_p)+(M_c.Cp_c)$ where $\Sigma M.Cp$=heat capacity of the system (kJ/° C.)
$M_p$=mass of process fluid (kg)
$Cp_p$=specific heat of process fluid (kJ.kg$^{-1}$K$^{-1}$)
$M_c$=mass of equipment in contact with process fluid (kg)
$Cp_c$=specific heat of equipment in contact with process fluid (kJ.kg$^{-1}$K$^{-1}$)

Conventional reactors have fixed area heat transfer surfaces (or occasionally several elements such as separate sections on the bottom dish and walls). They perform most effectively with a high and constant flow rate of heat transfer fluid to the jacket (or coils). Process temperature is controlled by varying the heat transfer fluid temperature. In the preferred system, the area of the heat transfer surface may be varied according to the needs of the reaction (although some variation in heat transfer fluid temperature can also be used) and the area is varied by operation of the valve of the present invention.

The heat transfer fluid is applied to the control equipment at constant pressure and temperature. In some cases temperature can also be varied where it is necessary to increase the operating range.

A key requirement of reactors of this type is reliability. This is particularly important in pharmaceutical applications where current good manufacturing practice (cGMP) dictates that the equipment operates within stated design parameters.

To provide a means of calibration and as a performance check, the reactor may be fitted with an electrical heater (or some other type of reference heater). By supplying a measured current to the heater, reliable reference loads are provided for calibrating the system and checking performance. In pharmaceutical applications, control and data acquisition systems together with software should be validated to comply with cGMP standards.

Figure 8:
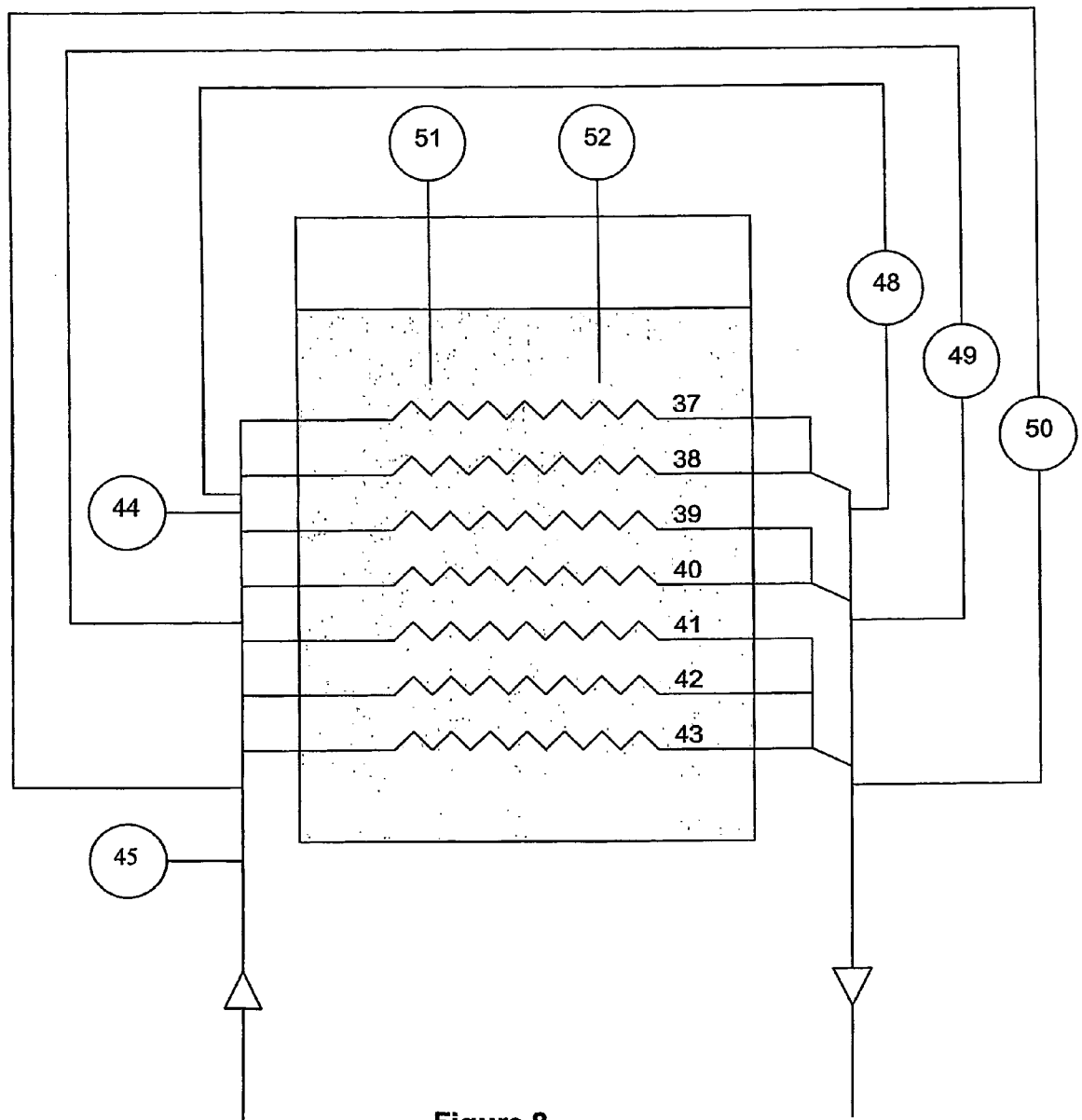
FIG. 8 is a schematic illustration of a process instrumentation.

In systems using a valve of the present invention where high precision is required, the equipment incorporates both conventional instrumentation and process specific instrumentation to obtain the information for operation of the valve. These process specific instruments operate at a higher than normal accuracy when compared to conventional instrumentation. FIG. 8 is a schematic illustration of typical process instrumentation which consists of:

A process temperature RTD instrument (51)
A process temperature thermocouple instrument (52)
heat transfer fluid differential temperature instruments (48), (49) and (50)
heat transfer fluid flow meter instruments (44) and (45)

For the process temperature RTD instrument (51) and the heat transfer fluid differential temperature instruments (48), (49) and (50), matching the RTD sensor to the temperature transmitter can result in significant improvements in control of the valve. The specific characteristic of an RTD sensor is unique to each device. By storing this information in the transmitter improvements in accuracy of operation of the valve are obtained. The constants used in this technique are known as the Callendar-Van Dusen (CVD) constants.

By 'process specific calibration', (e.g. the optimum reaction temperature) we mean that the instrument is calibrated specifically at the normal process set point of an instrument and that the measuring system error is adjusted, such that at this operating point best accuracy is achieved (for a normally calibrated instrument, best accuracy is usually given at the maximum calibrated range, or at a point dictated by the characteristics of the sensor). For example if a process is to be controlled at 35° C., instrument (51) would be calibrated across a small range, say 25 to 45° C. Furthermore, the instruments would be calibrated at 35° C. and adjusted so that at this specific point the error of the measuring system is the minimum achievable. Once installed and connected to the control system, the calibration of the instrument loop can be verified as a complete installation and any control system errors compensated for. The control system hardware is designed to minimise errors (precision components must be used) and thus optimise accuracy. Similarly the instrumentation installation must be such as to minimise measuring error.

The use of these additional steps, will allow maximum possible calibration accuracy to be obtained.

The process temperature thermocouple (52) can be calibrated in a similar manner, but as it is used to measure rate of change of temperature as opposed to temperature, its overall accuracy, although still important, is less significant.

The heat transfer fluid differential temperature measuring instruments (48), (49) and (50) will also employ this same technique to ensure best calibration accuracy is achieved.

For the heat transfer fluid flow instruments (44) and (45) the technique is again similar. Calibration in this instance is carried out over a small operating range with the emphasis on achieving the best accuracy at the preferred flow. By using multiple instruments calibrated over relatively small operating ranges, e.g. 0-1, 1-2, 2-3 etc., a significant improvement in accuracy is achieved than by using a single instrument calibrated over the range 0-3. Best accuracy is achieved by using a suitably sized instrument with a normal flow of 80 to 90% of the instrument span. Again, once installed in the field and connected to the control system, the calibration of the instrument loop should be verified as a complete installation and any control system errors compensated for. The control system hardware is again designed to minimise errors and thus optimise accuracy.

Figure 9:
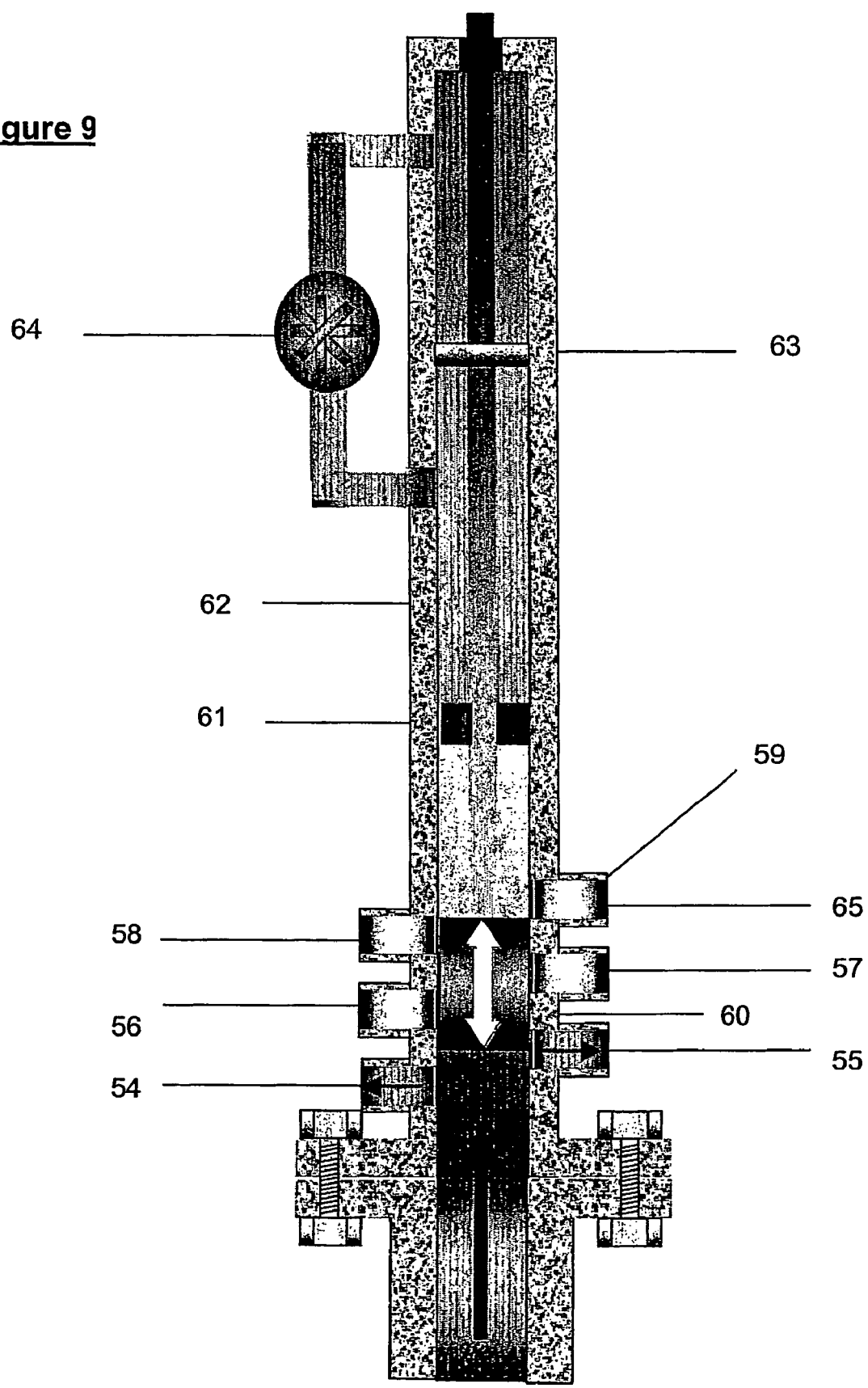
FIG. 9 shows a valve of the present invention.

FIG. 9 shows a valve of the present invention in which (53) is the inlet port for heat transfer fluid, (54 to 59) are the outlet ports, (60) is the plunger. The Figure shows the plunger position with outlet port (54) open, outlet port (55) partially open and outlet ports (56 to 59) closed. (61) is the seal between the heat transfer fluid and hydraulic fluid employed in the actuator shaft (62) and (63) is the actuator piston whose position is determined by a bi-direction variable speed hydraulic pump (64) which drives the shaft up and down the valve body to open and close the outlet ports. The arrows in FIG. 9 shows the flow of the heat transfer fluid.

Figure 10:
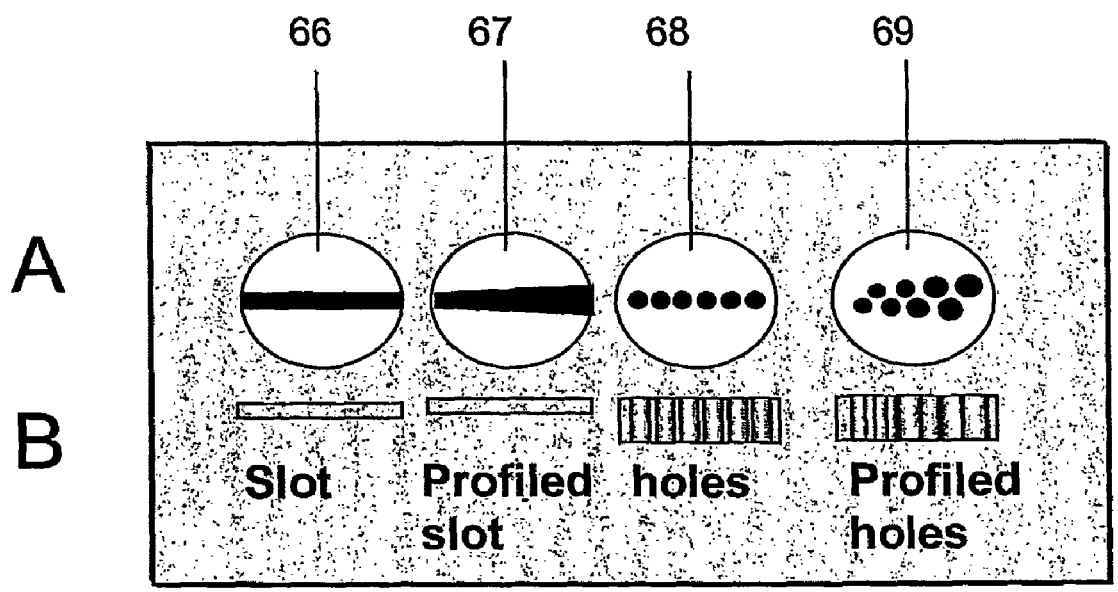
FIG. 10 shows various options for the valve orifices of the valves of FIG. 9.

FIG. 10 shows various options for the valve orifices (66 to 69) of the valves (54 to 59) of FIG. 9. (66 to 69 A) is the plan view of the orifices and (66 to 69 B) shows the same orifices in section view.

Routine calibration of the heat measuring equipment may be carried out in several steps as follows:

The first step is zero calibration. For accurate operation, zero calibration should be carried out for each type of process used. This permits the control system to compensate for any 'non-process' energy changes (e.g. heat gains and losses to the environment, energy gain from the agitator etc). The vessel is filled with liquid and the agitator switched on. It is then heated to the reaction temperature. When the temperature is stable at the operating temperature, the heating/cooling system will function at a very low level to compensate for non-process energy changes. The control system is zeroed under these conditions.

The second stage is to range and span the system. This is carried out by heating or cooling with a reference heater cooler. This may be in the form of an electrical heater or an independent heating/cooling coil. Heating. (or cooling) is carried out at several different energy input levels to range and span the system.

Alternatively the instruments may be tested individually in which case the second step of the above process may not be necessary.

We have found that the reactor systems using the control valves of the present invention are extremely useful as batch chemical synthesis reactors. We have also found that the same size of machine may be employed for development, pilot plant and full manufacturing purposes.

The preferred variable area heat transfer reactor is ideal for fast exothermic reactions, where it can operate as a small continuous flow reactor on processes hitherto conducted as batch reactions. Unlike large conventional batch reactors, it is possible to operate in this mode as the reaction is continuously monitored. Any fall off in conversion efficiency is detected immediately and forward flow is stopped. The benefits of operating in this mode are various. The capital cost of a reactor for this type of application is substantially lower than a conventional reactor. In addition higher throughputs can be achieved. This type of equipment is also ideal for dangerous reactions as the inventory of reactants can be much smaller than that needed for conventional reactors. The equipment can also be programmed to stop reagent addition if unconsumed reactant starts to accumulate.

The reactors can also be used in slow exothermic reactions even where large liquid volumes are held. In these reactors the data is obtained, analysed and used in a manner similar to the continuous reactor described above. The benefits of using this equipment for slow reactions is that the addition rate of the components can be regulated to prevent accumulation of unreacted chemicals. It is also possible to identify the end point of the reaction which offers substantial savings in plant utilisation as the product can be transferred forward with the confidence that it satisfies a key quality control objective. In some cases, accurate identification of end point also enhance product quality and yield.

The rate at which heat can be transferred between the process fluid and the heat transfer fluid is dictated (in part) by the overall heat transfer coefficient (U). The larger the value of U, the smaller the heat transfer area required. The U value may be calculated from three components.

The heat transfer resistance through the process fluid boundary layer

The heat transfer resistance through the coil wall

The heat transfer resistance through the heat transfer fluid boundary layer

The boundary layers are the stagnant layers of liquid either side of the coil wall. The faster the agitation (or liquid flow), the thinner the boundary layer. Thus high flow rates give better heat transfer. Also liquids with good thermal conductivity give better heat transfer through the boundary layers.

Heat transfer mechanism across the coil wall is similar, except (unlike the boundary layers) the distance through which the heat has to conduct is fixed. Higher heat transfer rates are achieved where the coil material has high thermal conductivity. Higher heat transfer rates are also achieved where the coil material is thin.

Thus a high U value requires both a thin coil material (with high thermal conductivity) and turbulent conditions in both liquids (the more turbulent, the better). The higher the U value, the smaller the area required for heat transfer. This means a shorter heat transfer coil.

It is therefore preferred to use the thinnest walled coils possible without compromising mechanical strength and corrosion tolerance. A typical wall thickness would be ½ to 4 mm.

The material from which the coil is fabricated is not critical but should be inert to the process fluid. Preferred materials include, stainless steel for non-corrosive organic fluids, Hastelloy C (22 or 276) or similar alloys for most reactions using chlorinated solvents or other corrosive compounds. Tantalum and titanium would be used where special corrosive conditions existed. In some applications other materials such as plastic, glass, glass lined steel or ceramics could be used.

The invention can be used in reactor systems which improve the operation of commercial chemical and physical reaction systems. It can however also be used in the provision of considerably smaller reaction systems with comparable commercial throughput. For example it may be used in systems which enable reduction of reactor size by a factor of 10 and, in some instances, a factor of 100 or greater. In particular it can be applied to current commercial batch organic synthesis reactions currently carried out in reactors of 10 to 20,000 liters.

bulk pharmaceutical synthesis reactions currently carried out in reactions of 10 to 20,000 liters.

batch polymerisation reactions currently carried out in reactors of 10 to 20,000 liters.

batch synthesis reactions of 10 to 20,000 liters currently used for unstable materials (compounds susceptible to self-accelerating runaways)

batch inorganic synthesis reactions currently carried out in reactions of 10 to 20,000 liters.

The techniques may also be useful in larger scale chemical and petrochemical operations.

The invention claimed is:

1. A control valve for the delivery of heat transfer fluids in a reaction system having a vessel comprising a batch reactor and a source of heat transfer fluid, the vessel containing a volume of process fluid and a plurality of heat transfer elements disposed in or about the vessel, said valve comprising:
    a valve body;
    a plurality of ports in said valve body that are in fluid communication with the plurality of heat transfer elements that are about the surface of the vessel;
    a movable element disposed in said valve body that permits independent control of the flow of heat transfer fluid through each of said plurality of heat transfer elements to provide heat transfer to the volume of process fluid in a cascade fashion thereby regulating the flow of said heat transfer fluid from the source of heat transfer fluid; and
    a control system in communication with said movable element that outputs a signal based on the needs of the reaction system to control the movement of said movable element to progressively open and/or close one or more ports to allow or prevent flow of heat transfer fluid in the elements and thus vary the number of heat transfer elements that contain heat transfer fluid.

2. The control valve of claim 1, wherein the output signal corresponds to preset parameters.

3. The control valve of claim 1, wherein the output signal corresponds to a temperature of the volume of process fluid.

4. The control valve of claim 1, wherein the output signal corresponds to heat output of the reaction of the volume of process fluid.

5. A method for controlling the flow of heat transfer fluid to a batch reactor comprising a reaction vessel and a plurality of heat transfer elements said batch reactor containing a volume of process fluid comprising:
    providing a valve body having a plurality of ports that are in fluid communication with the plurality of heat transfer elements;
    progressively opening, closing and/or partially closing each of said plurality of ports by operating a movable element disposed in said valve body in a cascade fashion to thereby independently control the flow of said heat transfer fluid in each of said plurality of heat transfer elements and vary the effective heat transfer area between the plurality of heat transfer elements and the volume of process fluid and controlling the operation of said movable element by means of a control system in communication with said moveable element that outputs a signal based upon the needs of the reaction system.

6. The method according to claim 5, in which the plurality of heat transfer elements are heating coils or cooling coils.

7. The method according to claim 6, wherein the heating coils or cooling coils are part of a heat exchanger.

8. The method according to claim 5, wherein the plurality of heat transfer elements are part of a vessel for undergoing physical or chemical changes.

* * * * *